May 16, 1939.    B. H. SMITH    2,158,805
PORTABLE COOKING STOVE
Filed Jan. 28, 1938    2 Sheets-Sheet 1

INVENTOR.
Benjamin H. Smith
BY Earl & Chappell
ATTORNEYS

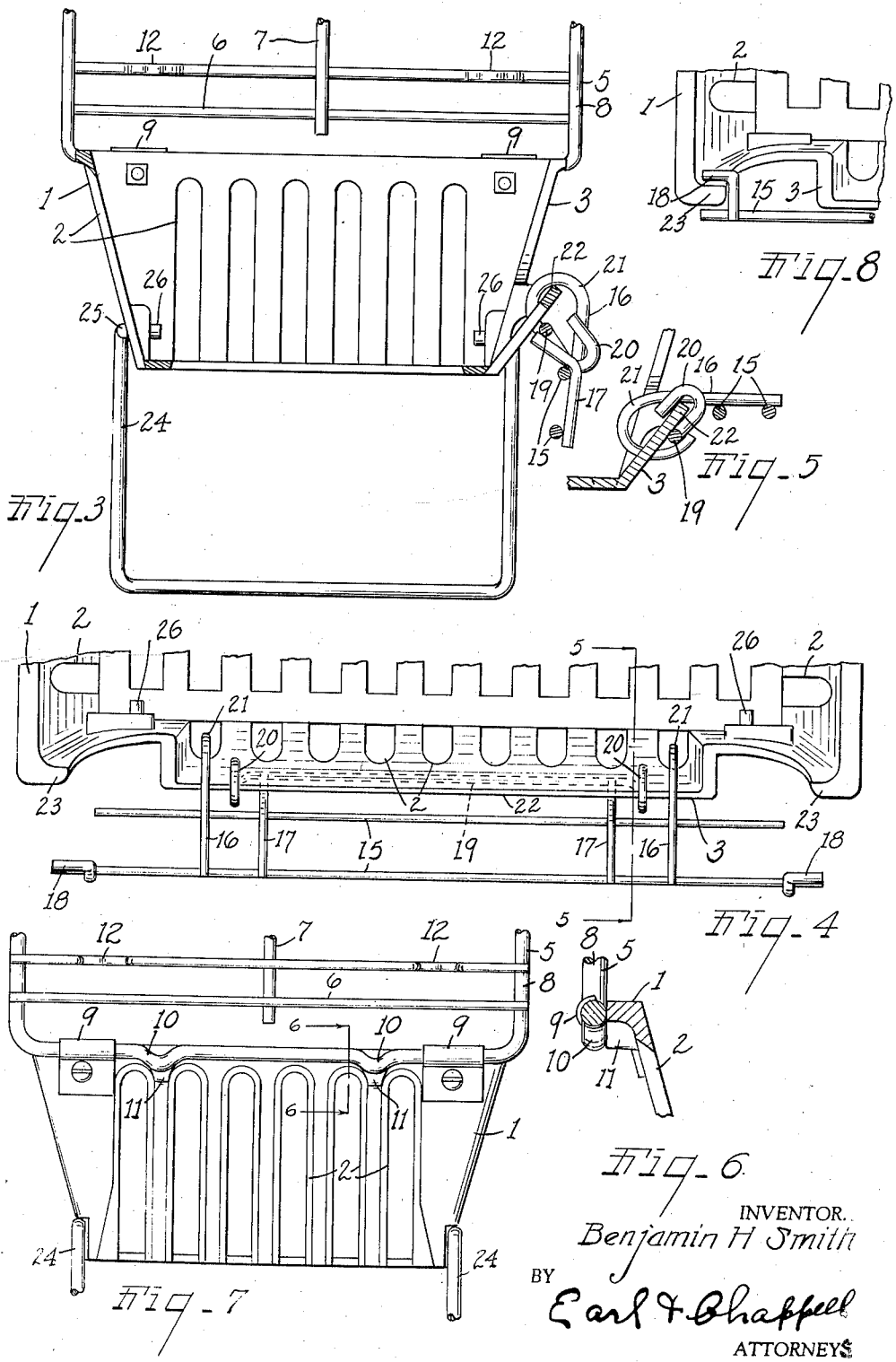

Patented May 16, 1939

2,158,805

UNITED STATES PATENT OFFICE 2,158,805

PORTABLE COOKING STOVE

Benjamin H. Smith, Niles, Mich., assignor to Michigan Wire Goods Company, Niles, Mich.

Application January 28, 1938, Serial No. 187,399

14 Claims. (Cl. 126—29)

This invention relates to improvements in portable cooking stoves.

The main objects of my invention are:

First, to provide a portable stove or camp stove having a wide range of adaptability for use.

Second, to provide a stove of the type described having features of adjustment to adapt the same for the cooking of different foods or for different types of cooking.

Third, to provide a stove of the type described having a fuel box or basket with a side opening for charging fuel therein and provisions for covering said opening so as to increase the fuel holding capacity and permit uniform distribution of the fuel in the basket when desired.

Fourth, to provide a stove of the type described having the provisions noted and further characterized by a hearth or supporting member connected thereto in such a manner as to be placed in a plurality of operative positions.

Fifth, to provide a stove of the type described having adjustable grid members adapted in one position to constitute a cooking grid and in another position to constitute supporting members whereby further grids or toasting or broiling devices may be supported at variable distances from the fuel bed.

Further objects relating to details and economies of my invention will definitely appear from the description to follow. The invention is defined in the claims.

A structure embodying the features of my invention is illustrated in the accompanying drawings, wherein:

Fig. 3 is a fragmentary view in section on line 3—3 of Fig. 2, illustrating details of construction of the stove.

Fig. 4 is a fragmentary top plan view of the stove illustrating the fuel containing basket and hearth member, the top grid members being omitted to simplify the showing.

Fig. 5 is an enlarged fragmentary view in section on line 5—5 of Fig. 4.

Fig. 6 is an enlarged fragmentary view in section on line 6—6 of Fig. 7.

Fig. 7 is a fragmentary view in end elevation of my stove with the top grid in vertical position.

Fig. 8 is a fragmentary top plan view illustrating details of construction.

Figure 1:
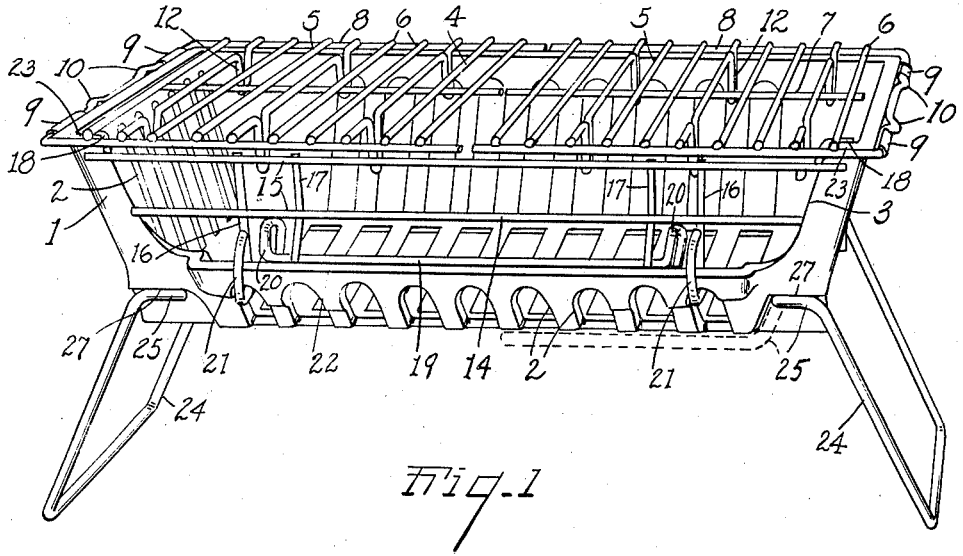
Fig. 1 is a perspective view of the stove of my invention in one of its operative adjustments.

The present invention relates to a cooking stove or gridiron which is portable and hence especially adapted for picnickers, campers, and the like. The same embodies a fuel basket or basket-like grate member of cast metal construction with which are associated collapsible wire leg members, adjustable wire top grid members, and an adjustable wire gate or hearth member, all of said provisions coacting to furnish a device which is highly adaptable and universal in its uses as will be more particularly hereinafter described.

In the embodiment of my invention illustrated, the coal or fuel basket 1, which is preferably of rectangular horizontal section, is suitably foraminated or provided with grate openings 2, and also to provide openings for the circulation of air. The fuel basket is preferably of cast iron which renders it well adapted to resist the heat from fuel such as charcoal, coal, coke, or wood.

One side of the fuel basket is cut away substantially at 3 to provide an opening through which the fuel may be conveniently charged. As indicated in the drawings, a top grid member generally indicated 4 normally rests across the flat top of the fuel basket and it is therefore apparent that by providing the side opening 3 additional fuel may be charged to replenish the fire without removing the said grid or any food which may be in process of cooking thereon. This concept constitutes a feature of primary importance in my invention.

Figure 2:
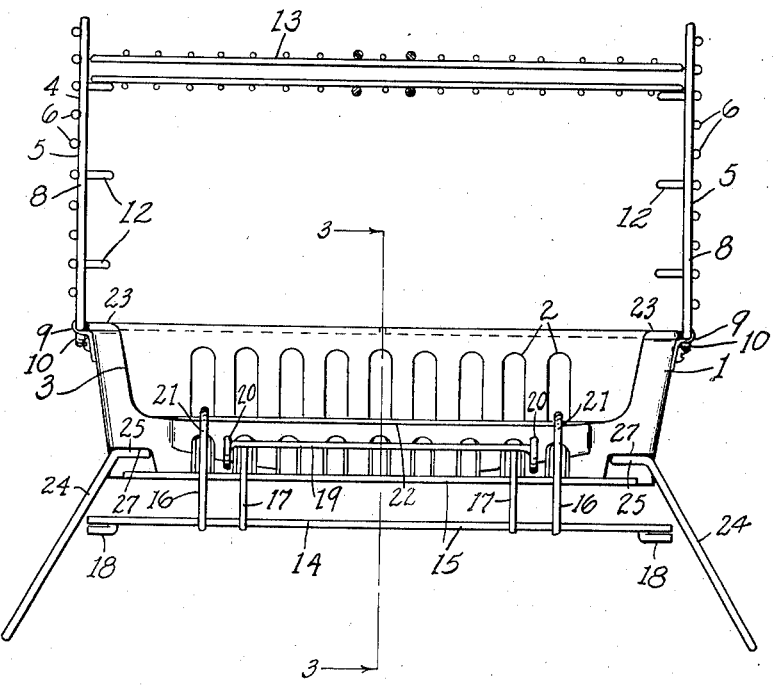
Fig. 2 is a view in front elevation of the device with the parts thereof in an alternate adjusted position.

The grid 4 is in the preferred embodiment of two-part construction as is clearly illustrated in Fig. 2, consisting of a pair of similar complementary grid members 5 made up of transverse and longitudinal elements 6, 7, respectively, of wire stock welded together and to the U-shaped pivotally supported frames 8 which are of a somewhat heavier gauge wire stock. The said frames are pivotally supported at their bights on the respective ends of basket 2, clip members 9 which are bolted to the fuel basket being employed for this purpose.

For reasons to be hereinafter described, I desire to pivotally mount the grid members 5 so that the same may be supported either in horizontal position as illustrated in Fig. 1 or in uprigh position as illustrated in Figs. 2, 3, and 7. Accordingly, I provide offsets or kinks 10 in the bights of the U-shaped frame, the said offsets being adapted to engage stop shoulders 11 formed integral with the fuel basket at the ends thereof, as illustrated in Figs. 6 and 7, to limit the movement of the grids. The purpose of supporting grid members 5 in the vertical position of Figs. 2, 3, 6, and 7 is to adapt the same as supports for various cooking implements or utensils which it may be desirable to maintain at varying distances from the fire. To this end, certain of the transverse members 6 are provided with inwardly extending offsets 12 which in vertical position of the grids constitute vertically spaced ledges or supports upon which an implement, such as a broiler 13, may be rested. Accordingly, different articles of food or foods desired to be cooked in different manners may be prepared at different levels relative to the fire at the same time. This permits the user to employ a utensil such as a broiler, which enables a better control to be had over the food in process of cooking than if the various articles of food were merely placed on a flat surface and turned over individually.

As stated above, the open charging front 3 enables fuel to be conveniently replenished with grid members 5 in the horizontal position shown in Fig. 1. However, with the grid members disposed as shown in Fig. 2, the fuel may be charged from the top of the fuel basket and accordingly it is desirable to close the said charging opening 3 and thus increase the fuel capacity of the basket and provide a more even cooking fire. For this purpose, I employ a swinging gate or closure generally indicated 14 which is adapted to be disposed either in closing position relative to opening 3 as illustrated in Figs. 1 and 8, or in inoperative depending position relative to the opening as illustrated in Figs. 2 and 3, or in an intermediate horizontal position as illustrated in Figs. 4 and 5, wherein the said closure extends outwardly from the fuel basket and is well adapted to serve as a rest or hearth upon which cooking utensils, forks, roasters, and the like may be placed instead of being laid on the ground. This combined closure and hearth in the embodiment illustrated consists of a plurality of longitudinal wire elements 15 connected by transverse elements 16, 17. The outermost longitudinal element 15 is provided with an integral offset latch lug 18 spaced therefrom for a purpose to be described. The transverse members 17 at their inner ends carry a further longitudinal element 19 having the ends thereof offset at right angles and hooked at 20 for a purpose to be described, see Figs. 2 and 5. Transverse members 16 terminate in partial bights 21 which loosely and pivotally engage the offset side 22 of the basket adjacent opening 3 as illustrated in Figs. 1, 2, 3, and 5.

In Figs. 2 and 3, the member 14 is as stated illustrated in inoperative depending position, in which position the charging opening 3 is fully exposed to permit charging of fuel to the basket; notwithstanding grid members 5 may be in horizontal position over the same. In Figs. 4 and 5, the member 14 is illustrated in horizontal intermediate position, wherein it is secured by pushing the closure member inwardly to engage the hook 20 over the bottom edge of the fuel basket, thus supporting the closure member in that position and constituting the same a hearth or rest as described. In Figs. 1 and 8 I illustrate the position of the parts with the closure member in fully closed position over opening 3 and constituting in effect a fourth wall for the fuel basket. This position is attained by raising the closure member, then dropping it so as to hook lugs 18 behind the basket edge 23, see Fig. 8. The loose pivotal connection of the eyes 21 with the basket permits the lateral shifting and swinging movements of the closure member which have been described.

In order to support the fuel basket suitably from the ground to create an appropriate draft and for other purposes, I utilize a pair of U-shaped leg supports 24 each terminating in an angled offset 25 and inwardly extending bails 26 which have pivotal mounting in apertures formed in the basket to receive the same. The fuel basket is cast to provide recesses adjacent these pivot points and shoulders 27 cooperating with offsets 25 to limit the outward pivotal movement of the leg members. In Fig. 1, I illustrate in dotted lines the manner of collapsing the leg members whereby to render the structure exceedingly compact for transportation etc.

Briefly stated, the advantages of my construction are as follows: It is light in weight and readily transportable. It has an open fuel charging front for refueling the fire without removing cooking utensils etc. from the top. The top grid itself is adjustable either from a horizontal supporting position to position to support utensils at various levels for different cooking purposes and in such raised position of the food supporting surface there is available a closure for closing the open charging front and thus increasing the fuel capacity of the basket. The construction is simple, strong, and involves no parts apt to be damaged by rough treatment. In fact, an essential characteristic of the present structure is its sturdiness.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a portable cooking stove, a fuel basket having an open side providing a charging opening, grid members pivoted to opposite ends of said fuel basket and adapted to be swung to a horizontal position over the same or swung to an upright position to provide utensil supports, a closure for said charging opening of wire construction mounted for pivotal and lateral adjustment on said fuel basket, means on said closure to secure the same in closing position, and means on said closure for supporting the same in another position relative to said fuel basket whereby to constitute a hearth therefor.

2. In a portable cooking stove, a fuel basket having an open side providing a charging opening, grid members pivoted to opposite ends of said fuel basket and adapted to be swung to a horizontal position over the same or swung to an upright position to provide utensil supports, and a closure for said charging opening mounted for adjustment to closing position or to a horizontal position in front of the charging opening.

3. In a portable cooking stove, a fuel basket having an open side providing a charging opening, grid members pivoted to opposite ends of said fuel basket and adapted to be swung to a horizontal position to provide utensil supports, and a closure for said charging opening.

4. In a portable cooking stove, a fuel basket having an open side providing a charging opening, grid members adapted to rest horizontally over said fuel basket, said grid members being mounted on said fuel basket to permit their adjustment to an upright position providing utensil supports and being provided with a plurality of opposed supports with which a utensil may be selectively engaged at different elevations relative to the fuel basket, and a grid-like closure member pivotally mounted on said fuel basket and provided with means for securing it in closing relation to said fuel basket.

5. In a portable cooking stove, a fuel basket having an open side providing a charging opening, grid members adapted to rest horizontally over said fuel basket, said grid members being mounted on said fuel basket to permit their adjustment to an upright position providing utensil supports and being provided with a plurality of opposed supports with which a utensil may be selectively engaged at different elevations relative to the fuel basket, and a grid-like closure member for said charging opening.

6. A cooking stove of the type described comprising a cast metal fuel basket of foraminated construction constituting a grate, said basket having a side fuel charging opening, a wire closure member for said opening mounted on said basket for swinging and lateral adjustment, said closure member being provided with lugs engageable within the edges of said fuel opening by swinging the closure member to an upright position and then permitting the lugs to drop behind such edges, and supporting members on said closure member engageable with the bottom edge of said charging opening by swinging and lateral manipulation of the closure member whereby the closure member is supported in a horizontal position to constitute a hearth at the front of the charging opening, the supporting means for said closure member also permitting it to be swung to a depending position.

7. A cooking stove of the type described comprising a cast metal fuel basket of foraminated construction constituting a grate, said basket having a side fuel charging opening, and a wire closure member for said opening mounted on said basket for swinging and lateral adjustment, said closure member being provided with lugs engageable within the edges of said fuel opening by swinging the closure member to an upright position and then permitting the lugs to drop behind such edges.

8. A cooking stove of the type described comprising a cast metal fuel basket of foraminated construction constituting a grate, said basket having a side fuel charging opening, a wire closure member for said opening mounted on said basket for swinging and lateral adjustment, and supporting members on said closure member engageable with the bottom edge of said charging opening by swinging and lateral manipulation of the closure member whereby the closure member is supported in a horizontal position to constitute a hearth at the front of the charging opening, the supporting means for said closure member also permitting it to be swung to a depending position.

9. A cooking stove of the type described comprising a fuel basket having a side fuel charging opening, a closure member for said opening mounted on said basket for swing and lateral adjustment, said closure member being provided with means engageable with the basket by swinging the closure member to an upright position and then shifting said member laterally to support the closure member in operative closing relation to the opening, and means engageable with the basket by swinging and lateral manipulation of the closure member for supporting the closure member in a horizontal position to constitute a hearth.

10. A cooking stove of the type described comprising a fuel basket having a side fuel charging opening, and a closure member for said opening mounted on said basket for swinging and lateral adjustment, said closure member being provided with means engageable with the basket by swinging the closure member to an upright position and then shifting said member laterally to support the closure member in operative closing relation to the opening.

11. A cooking stove of the type described comprising a fuel basket having a fuel charging side opening therein, and a closure for said side opening loosely swingably mounted on the wall of said fuel basket below the charging opening for adjustment to a position to close the charging opening or to a horizontal position to constitute a hearth in front of the charging opening or to a depending inoperative position, said closure having elements thereon engageable with the basket to hold the closure in closing or horizontal positions, the loose swingable mounting of the closure permitting lateral manipulation of the closure to engage said elements with the basket.

12. In a portable stove, the combination of a fuel basket, and grid members pivotally mounted on said fuel basket and swingable to a horizontal complementary position to constitute a grid or to an upright position to constitute utensil supports, said grid members having a plurality of spaced utensil supports thereon disposed in opposed pairs when the grid members are adjusted to utensil supporting position.

13. In a portable stove, the combination of a fuel basket, and grid members pivotally mounted on said fuel basket and swingable to a horizontal complementary position to constitute a grid or to an upright position to constitute utensil supports.

14. In a stove of the type described, an open-top grate, a pair of grid members pivotally connected to said grate, said grid members being adapted to lie parallel with and over the top of said grate and being swingable relative thereto, means for limiting said swinging movement, and means on said grid members constituting article supports when said grid members are swung upwardly to upright position.

BENJAMIN H. SMITH.